(12) United States Patent
Sepkhanov

(10) Patent No.: US 10,222,025 B2
(45) Date of Patent: Mar. 5, 2019

(54) LIGHT DIFFUSER, LED LAMP ARRANGEMENT USING THE SAME, AND MANUFACTURING METHOD

(71) Applicant: PHILIPS LIGHTING HOLDING B.V., Eindhoven (NL)

(72) Inventor: Ruslan Akhmedovich Sepkhanov, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 121 days.

(21) Appl. No.: 15/110,560

(22) PCT Filed: Jan. 8, 2015

(86) PCT No.: PCT/EP2015/050186
§ 371 (c)(1),
(2) Date: Jul. 8, 2016

(87) PCT Pub. No.: WO2015/110286
PCT Pub. Date: Jul. 30, 2015

(65) Prior Publication Data
US 2016/0327238 A1    Nov. 10, 2016

(30) Foreign Application Priority Data
Jan. 23, 2014    (EP) .................................... 14152243

(51) Int. Cl.
*F21K 9/62*    (2016.01)
*F21V 5/04*    (2006.01)
(Continued)

(52) U.S. Cl.
CPC ................ *F21V 5/045* (2013.01); *F21K 9/62* (2016.08); *F21V 5/002* (2013.01); *G02B 3/0068* (2013.01);
(Continued)

(58) Field of Classification Search
CPC ....... F21V 5/045; F21V 5/002; G02B 5/0231; G02B 5/0215; G02B 27/30; F21K 9/62
See application file for complete search history.

(56) References Cited

U.S. PATENT DOCUMENTS

| 2002/0034710 A1 | 3/2002 | Morris et al. |
| 2005/0063064 A1* | 3/2005 | Becker ...................... F21V 5/04 359/599 |

(Continued)

FOREIGN PATENT DOCUMENTS

| JP | 04895141 B2 | 3/2012 |
| WO | WO199950596 A2 | 10/1999 |
| WO | WO2013012858 A2 | 1/2013 |

*Primary Examiner* — Evan P Dzierzynski
(74) *Attorney, Agent, or Firm* — Akarsh P. Belagodu (57) ABSTRACT

A light diffuser is formed of a slab of material which has opposing first and second main surfaces, wherein each surface comprises an array of light directing facets. Each light directing facet of the first surface directs incident light through the slab predominantly to a corresponding paired light directing facet of the second surface, and at least some different light directing facets of the first surface direct incident light to their corresponding paired light directing facets of the second surface in different directions. The angular profile at the exit can be controlled, and for example does not need to diverge more at the output of the diffuser than at the input.

15 Claims, 4 Drawing Sheets

(51) Int. Cl.
*G02B 3/00* (2006.01)
*G02B 5/02* (2006.01)
*F21V 5/00* (2018.01)
*G02B 27/30* (2006.01)
*F21Y 115/10* (2016.01)

(52) U.S. Cl.
CPC ......... *G02B 5/0215* (2013.01); *G02B 5/0231* (2013.01); *G02B 5/0278* (2013.01); *G02B 27/30* (2013.01); *F21Y 2115/10* (2016.08)

(56) References Cited

U.S. PATENT DOCUMENTS

| | | |
|---|---|---|
| 2006/0215054 A1 | 9/2006 | Liang et al. |
| 2007/0297168 A1* | 12/2007 | Chang .................. G02B 5/0231 362/223 |
| 2008/0037284 A1* | 2/2008 | Rudisill .................. F21S 2/005 362/629 |
| 2011/0134355 A1* | 6/2011 | Yi ...................... G02F 1/133512 349/58 |
| 2011/0234580 A1 | 9/2011 | Wang et al. |
| 2012/0037207 A1 | 2/2012 | Mimura et al. |
| 2012/0307180 A1* | 12/2012 | Wang .................. G02B 5/0215 349/64 |

* cited by examiner

LIGHT DIFFUSER, LED LAMP ARRANGEMENT USING THE SAME, AND MANUFACTURING METHOD

CROSS-REFERENCE TO PRIOR APPLICATIONS

This application is the U.S. National Phase application under 35 U.S.C. § 371 of International Application No. PCT/EP2015/050186, filed on Jan. 8, 2015, which claims the benefit of European Patent Application No. 14152243.3, filed on Jan. 23, 2014. These applications are hereby incorporated by reference herein.

FIELD OF THE INVENTION

This invention relates to light diffusers.

BACKGROUND OF THE INVENTION

Light diffusers are very widely used in lighting applications as one of the basic building blocks for luminaries. They are employed to diffuse light and, thus, to make light sources or luminaire exit windows give softer light.

With the current trend of using LED lights, and the glare associated with the small feature size of LEDs, there is particular attention devoted to optical diffusers.

In LED lighting applications, diffusers are applied to hide the LEDs, make the LEDs appear effectively larger or prevent an observer from looking directly into the LEDs. All these measures lead to decreased glare nuisance and better aesthetically looking luminaries.

The optical function of a diffuser is to scatter light and thus to produce softer light or more homogeneous light emitting surfaces (or exit windows). Light scattering is at the same time the main disadvantage of diffusers: they broaden the initial light beam giving an increase of the Etendue. This can be an undesirable consequence of the use of a diffuser.

Figure 1:
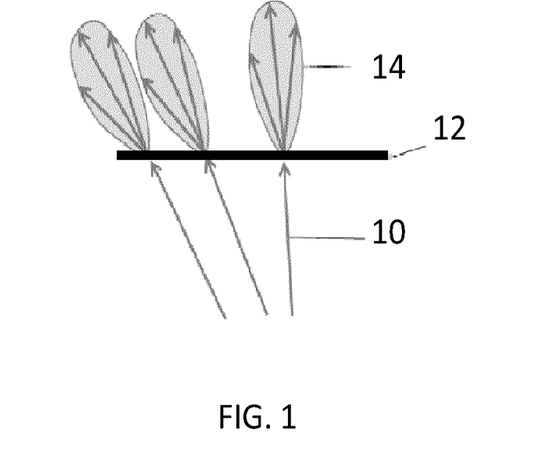
FIG. 1 shows the known operation of a diffuser.

This effect of light scattering by diffusers is shown in FIG. 1. Each light beam 10 that is incident on the diffuser 12 is broadened when generating the diffused output light 14. The broadening is proportional to the scattering strength of the diffuser. Therefore, in order to homogenize a certain light emitting surface by means of a diffuser, there is generally a need for additional beam-shaping optics to collimate the beam broadened by the diffuser.

It would therefore be desirable to provide a light diffuser which counteracts the problem of broadening the general output range of light directions, for example so that collimating optics for collimating the general output range of light directions can be avoided.

US20120037207 discloses an optical layer having opposing first and second main surfaces, wherein both the first and second surface comprise an array of angled facets with a respective angled orientation to its respective main surface.

SUMMARY OF THE INVENTION

The invention is defined by the claims.

According to an example, there is provided a light diffuser comprising:

a slab of material having opposing first and second main surfaces, wherein both the first and second surface comprise an array of light directing elements, each element comprising an angled facet with a respective angled orientation to its respective main surface and comprising an in-plane facet lying in plane with its respective main surface, wherein light impinging in a first direction on said first main surface, by the angled orientation of the angled facet of the first surface is to be directed as deflected light essentially only to an associated angled facet of the second surface, wherein said deflected light impinging on the associated angled facet of the second surface, by its angled orientation is to redirect light in an output direction, and wherein at least some angled facets of the first surface have mutually different angled orientations to direct incident light to their associated angled facets of the second surface in mutually different directions.

The light diffuser functions by shuffling the light spatially by the angled facets, and the exit angle of the light can remain unaltered, or it can be deliberately controlled. For example the range of angles of exit light from the light diffuser can if desired be equal to or less than the range of angles of incident light to the light diffuser. This shuffling provides a localised diffusion function. However, a broadening of the light output beam can be prevented. The output range of light directions can form a parallel beam or a diverging or converging beam. The light diffuser can for example be placed at the exit window of a luminaire to homogenize the exit window leaving the angular beam distribution unaltered. This means that no additional beam-shaping optics is required to shape the beam after diffusing, because the light diffuser preserves (or improves) the beam shape. The diffuser offers enormous possibilities for achieving uniformity in lighting and/or optical devices by relatively simple means.

By having at least some different angled facets of the first surface which direct incident light to their corresponding paired angled facets of the second surface in different directions, it means that the angled facets do not just shift the light in the same direction, but perform a shuffling function. All angled facets of the first surface have an associated direction to which they redirect their incident light. There can be a set of such possible directions. The directions can be defined with an element of randomness to provide a random (or pseudo random) light shuffling function.

To render the diffuser to be relatively efficient each light directing element comprises an in-plane facet extending essentially in plane with the main surface. On average light impinges perpendicularly on the first main surface and hence then also impinges perpendicularly on the in-plane facets. The degree of Fresnel reflections on a surface, and hence the efficiency of use of light, depends on the angle of incidence on said surface. By providing each light directing element both with angled facets and with in-plane facets, light diffusion with relatively high efficiency is obtained.

Each angled facet in the first surface preferably directs incident light to a corresponding paired light angled of the second surface which is within a predetermined radius from a directly opposing angled facet on the second surface. This range is dependent on the physical and optical configuration. The greater the radius, the greater the amount of homogenisation that can be achieved.

The angled facets within the predetermined radius can each be at a respective vector translation from the centre. There can then be paired angled facets corresponding to each of the different vector translations. By providing paired angled facets for each of the different vector directions/ translations, all possible different redirection functions of the angled facets on the first surface can be implemented, and this avoids that the diffuser simply performs an image shift as mentioned above. These directions can be allocated in a randomised manner.

The in-plane facets and the angled facets preferably tessellate to fill the area of the diffuser. The tessellation can be random (e.g. a Voronoi tessellation), a semi-regular tessellation that includes angled facets of different shapes and sizes, or regular square tessellation, or regular triangular tessellation. A regular tessellation can for example use angled facets which can be square or hexagonal.

In one set of examples, for each first angled facet of the first surface and corresponding paired second angled facet of the second surface not directly opposite the first, a third angled facet of the first surface in a position opposite the second angled facet is paired with a fourth angled facet of the second surface in a position opposite the first angled facet. In this way one corresponding pair of angled facets is matched with a conjugate corresponding pair. In this way, a light path is essentially swapped between the two pairs providing a shuffling operation. This matching of pairs makes the design process easier to ensure a desired one-to-one deterministic mapping between the angled facets of the first surface and the angled facets of the second surface.

The angled facets can be planar surfaces. This is of particular interest when the angled facets receive a collimated incident light beam.

Alternatively, the angled facets can include lensing surface shapes. This enables the angled facets themselves to perform a collimating and then decollimating function.

An embodiment also provides an LED lamp arrangement, comprising:

an LED lighting unit; and
the light diffuser.

The LED lighting unit can comprise a plurality of LED lamps. The diffuser can for example function to mix different colour LEDs.

An embodiment also provides a method of manufacturing a light diffuser, which light diffuser comprises a slab of material having opposing first and second main surfaces, wherein each surface comprises an array of angled facets, wherein each angled facet of the first surface directs incident light predominantly to a corresponding paired angled facet of the second surface wherein each angled facet of the second surface directs its incident light to an output direction, wherein the method comprises:

choosing randomly a first angled facet on the first surface;
choosing randomly a second angled facet on the second surface within a predetermined radius of a location on the second surface opposite the first angled facet and defining these as a corresponding first pair;
if the first pair are not opposite each other, defining a third angled facet of the first surface in a position opposite the second angled facet and a fourth angled facet of the second surface in a position opposite the first angled facet as a second pair;
repeating the defining steps until all angled facets are paired; and
manufacturing the light diffuser by forming angled facets in the first surface which direct incident light to the corresponding paired angled facets in the second surface.

This method enables all angled facets to be paired in a simple manner and for many (e.g. thousands) of angled facets. The random element assists in randomising the diffused output.

Choosing randomly a second angled facet can comprise applying a probability density function to make it more probable to choose second angled facets that lie further away from the first angled facet.

BRIEF DESCRIPTION OF THE DRAWINGS

Examples of the invention will now be described in detail with reference to the accompanying drawings, in which.

DETAILED DESCRIPTION OF THE EMBODIMENTS

Examples relate to homogenizing the exit window of a luminaire or other light source. This desire is receiving increasingly more attention. The aim is to reduce the glare and from the aesthetics point of view to have a homogeneous light emitting surface/exit window.

In particular, homogenizing the exit window of an array of collimators is a key design aim for LED lighting, because an array of collimators produces an aesthetically unappealing so-called "shower head" effect due to the dark areas between the collimators and dark rings inside the collimators.

Currently, this problem is solved by diffusing the beam with a conventional diffuser and then collimating the light again by means of additional optics (normally bulky reflectors). This increases the cost and size of the luminaire.

Embodiments provide a light diffuser in which a slab of material has opposing first and second main surfaces, wherein each surface comprises an array of light directing elements each comprising an in-plane facet and an angled facet. Each angled facet of the first surface directs incident light predominantly to a corresponding paired angled facet of the second surface, and at least some different angled facets of the first surface direct incident light to their corresponding paired angled facets of the second surface in different directions. This arrangement provides a diffuser function. However, the angular profile at the exit can be controlled, and for example does not need to diverge more at the output of the diffuser than at the input.

The spatial diffuser can be placed directly on top of an array of collimators for example, and can thus be used to homogenize their light output elegantly and cost-effectively solving the "shower head" problem.

Figure 2:
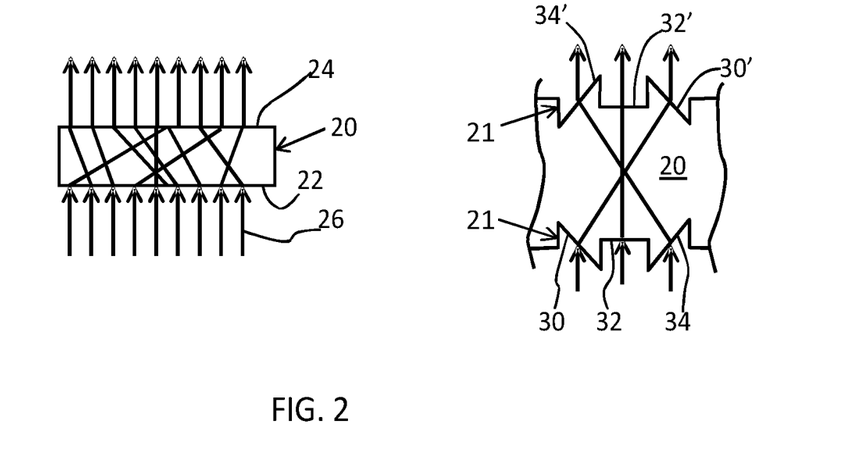
FIG. 2 shows the operation of a diffuser of an embodiment and the structure of a part of the diffuser in more detail.

FIG. 2 shows the operation of one example of spatial diffuser 20. The diffuser is an optical device that consists of two structured surfaces 22,24 which are generally parallel and face each other across the thickness of the diffuser. The diffuser has a panel type structure formed of an optically transparent material, for example with a relatively small thickness compared to the dimensions of the panel.

The material does not need to be perfectly transparent, but it does implement a light transmission function. The surfaces 22,24 can be parallel but this also is not essential. They can be non-parallel to define a wedge shape or more complicated contours.

The first surface 22 is structured such that it refracts parts of the incoming beam 26 redirecting those parts in various directions. The second surface 24 picks up these parts and restores their initial direction. This is shown in the left part of FIG. 2. The parts 26 of the beam will be denoted as rays although in practice they cover an area.

FIG. 2 shows incoming parallel light rays, and this initial parallel (and normal) incident direction of the rays is restored by the second surface 24 so that net effect is the spatial shuffling of the initial light beam with no change in direction.

FIG. 2 also shows one example of some opposing light directing element arrangements 21 each with an in-plane facet 32, 32' and angled facets 30,30',34,34' to show how the spatial light shuffling function takes place. Only two angled facets are shown on each surface for simplicity.

The first surface 22 has a first angled facet 30 angled so that it is not normal to the incident light direction, an in-plane facet facet 32 which is normal to the incident light direction and a second angled facet 34 angled so that it is not normal to the incident light direction. The first and second angled facets cause ray redirection as shown. They are then directed towards corresponding angled facets on the second surface which are angled to restore the original ray direction. However, as an alternative, the second surface 24 can give new desired predefined directions to the rays instead of restoring the incident beam directions.

This example shows two angled facets on each surface which provide a beam swapping function, in addition to in-plane facets on each surface which provide an efficient pass through function with only very limited Fresnel reflections. The second surface has angled facet 30' which receives the redirected light from angled facet 30, in-plane facet 32' which receives the passed through light from in-plane facet 32 and angled facet 34' which receives the redirected light from angled facet 34. The way oppositely slanted angled facets 30,34 are on opposite sides of a in-plane facet 32 oriented normally is only an example.

The use of angled facets arranged in pairs to provide light swapping simplifies the design of the face orientations and the mapping between the angled facets of the two surfaces as will be seen from the description below. However, the mapping between the surfaces can be more complicated.

Essentially, a one-to-one mapping is required from the angled facet set of the first surface to the angled facet set of the second surface. One angled facet in the first surface can only map to a angled facet in the second surface which is within range. This range will depend on the refractive index of the material (since this defines the light bending angles), and the thickness of the slab. How many alternative angled facets are within this range will depend on the size of the individual angled facets.

Each surface of the diffuser panel thus comprises an array of angled facets, and each one directs its incident light to an allocated angled facet on the second surface.

The in-plane facets and the angled facets of the array preferably tessellate, so that in some examples each in-plane facet and each angled facet is square, hexagonal, triangular or other suitable shapes. Angled facets of different shapes can be used within one device to provide an irregular tessellation. Each one can have a planar surface oriented with a corresponding angle with respect to the overall plane of the diffuser, to produce the desired ray redirection so that the rays redirected by the angled facets of the first surface 22 end up at known locations on the second surface 24.

In order to keep the ray direction under control there should be a deterministic relation between the first and the second surfaces, so that each angled facet on the first surface routes its light to a corresponding unique angled facet on the second surface. Each ray then experiences refraction by one angled facet on the first surface and one angled facet on the second surface with a mapping between the two surfaces of corresponding pairs of angled facets.

A method for designing the angled facets to provide the desired mapping between the two surfaces will now be described.

First, a grid of angled facets on each of the surfaces is defined. By way of example square angled facet arrangements will be considered, without loss of generality.

Figure 3:
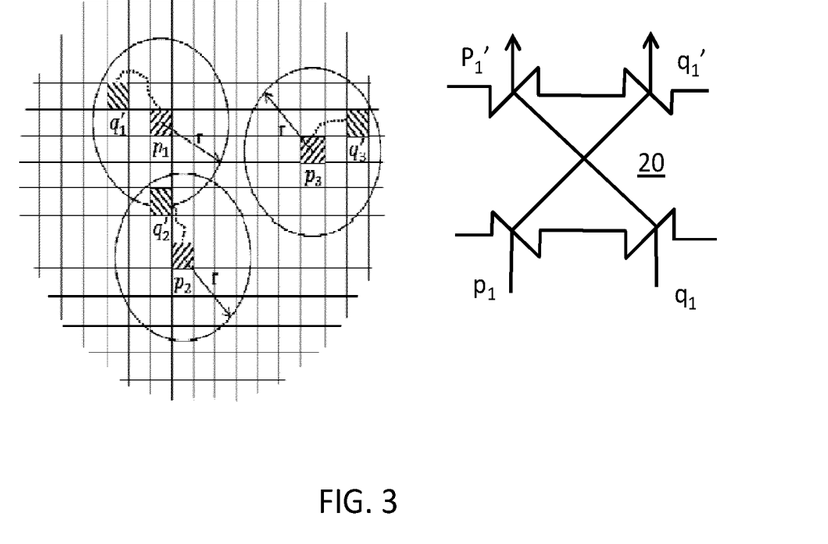
FIG. 3 is used to explain a design and manufacture method.

The following algorithm defines the pairs of angled facets and thus establishes a mapping between the surfaces. FIG. 3 is used to explain the method. Angled facet names $p_i$ and $q_i$ refer to the on-surface coordinates of the angled facets while symbol "prime" refers to the second surface.

The method comprises:
1. Choose randomly a angled facet on the first surface $p_1$. This random choice can be governed by a certain probability density, e.g. it can be made more probable to first choose angled facets that lie in the direct vicinity of the inhomogeneities of the incoming light beam.
2. Find the angled facets on the second surface that are allowed to pair with $p_1$. These are the angled facets that are located within the radius r from the angled facet $p'_1$ (which is the angled facet on the second surface directly opposite the angled facet being considered on the first surface) and that have not yet been paired with other angled facets. The angled facet $p'_1$ has the same on-surface coordinate as $p_1$ but is located on the second surface. This set of allowed angled facets includes the angled facet $p'_1$ itself. In this way, some pass through pairs can be defined.
3. Choose randomly a angled facet on the second surface $q'_1$ from these allowed angled facets. This random choice can be governed by a certain probability density, e.g. it can be made more probable to choose angled facets that lie further away from the initial angled facet $p_1$ to make efficient use of the radius r for the spatial shuffling of the light beam.
4. Pair the angled facets $p_1$ and $q'_1$.
5. Pair the angled facets $q_1$ and $p'_1$. This pair $q_1$-$p'_1$ is conjugate to the pair $p_1$-$q'_1$ that was paired in step 4. Note that this only applies for pairs which are not directly opposite. This property of the pairs and the corresponding ray paths are shown in the right part of FIG. 3. In this way angled facets are paired to provide a light swapping function.
6. Repeat steps 1 to 5 until all angled facets are pared.

For any chosen angled facet this method always enables a angled facet to be located on the second surface to pair with. Thus, this method provides a computationally very simple approach to defining the desired one-to-one mapping whilst additionally encompassing the physical limitation that one angled facet can only pair with a corresponding angled facet within a particular radius. The random element of the design improves the randomness of the diffusion property.

The use of conjugate pairs (so that light is swapped between pairs of locations) simplifies the design process. However, a more complicated mesh type mapping can instead be used. The diffuser can be for generally randomising the light or it can be designed taking into account the light source with which it is to be used.

As mentioned above, the radius r is limited by how strongly a ray can be refracted by a angled facet of the first surface. Thus, the radius r depends on the refractive index of the diffuser material n and the diffuser thickness T.

In one example, when the diffuser surfaces are the top and bottom surfaces of a slab of material, the radius r is given by $$r = T \tan\left[\alpha - a\sin\left(\frac{1}{n}\sin\alpha\right)\right],$$

where α is the maximum facet angle, which is a value close to 90 degrees. In the case the diffuser surfaces are some other surfaces the expression for the radius r will change, but it will remain a function of the distance between the surfaces and the index of refraction.

Figure 4:
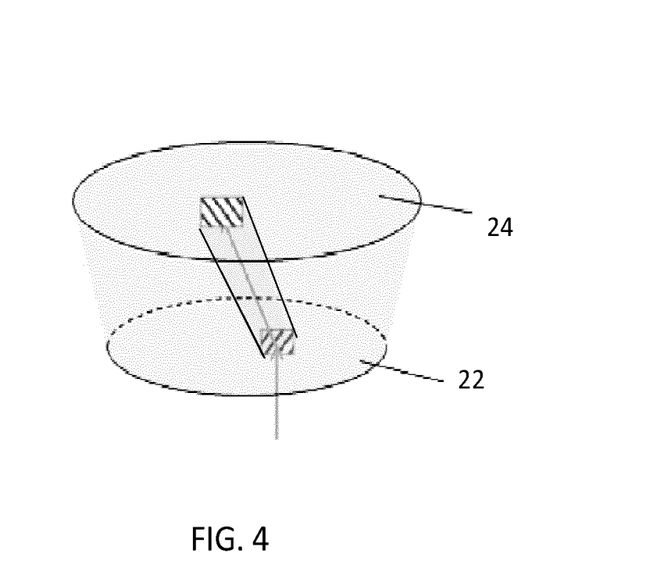
FIG. 4 shows a different example of diffuser for receiving diverging incident light.

The explanation above is based on the processing of parallel incident light. The spatial diffuser can be used to process non-parallel (divergent) incident beams. There are at least two solutions for a diverging beam:

1. The angled facets of the second surface 24 as well as the surface itself can be made larger to follow the increase of the projection of the first angled facet onto the second surface due to the divergent light beam. This approach is illustrated in FIG. 4.

Figure 5:
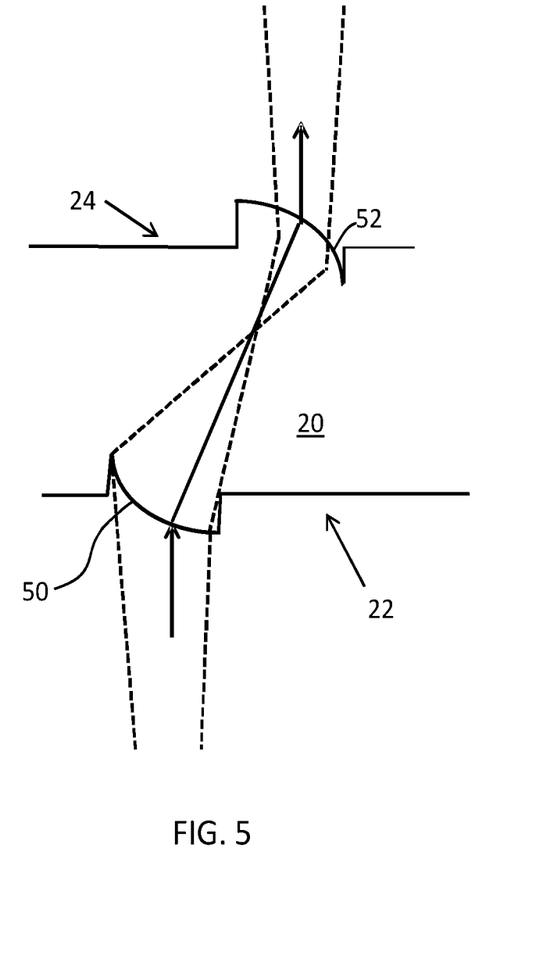
FIG. 5 shows an alternative angled facet design.

2. The profile of the angled facets on the first and second surfaces can be curved. In this way, the angled facets incorporate a lensing function. In addition to changing the ray direction, the angled facets of the first and the second surfaces can additionally collimate and decollimate the beam, respectively. This approach is shown in FIG. 5. A single angled facet is shown on the first surface 22 paired with a single angled facet on the second surface 24. As shown, the angled facets have a curved lensing surface 50,52. The power of the lenses on the first and the second surfaces can be optimized depending on the divergence angle of the light beam. The angled facets with curved profile function to redirect the beam but also function as lenses collimating and decollimating the beam.

Figure 6:
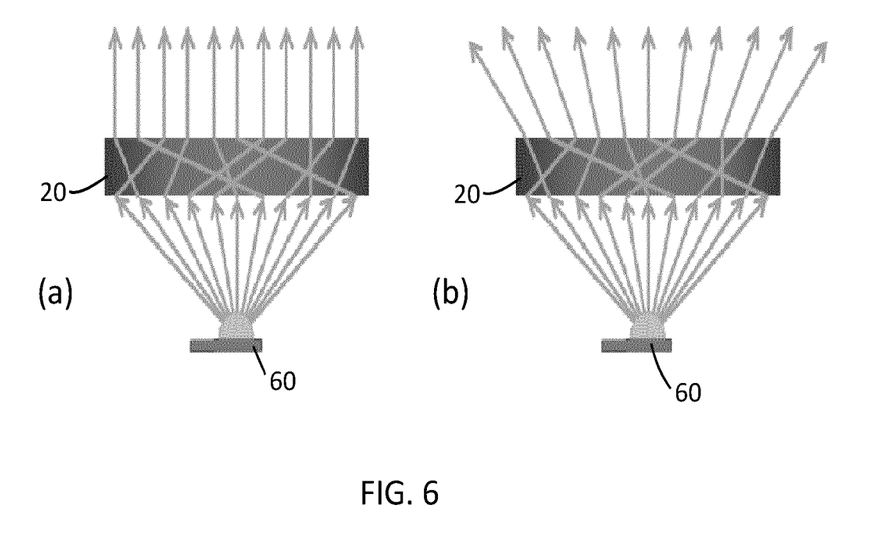
FIG. 6 shows two possible uses of the diffuser.

FIG. 6 shows a first example of possible use of the spatial diffuser. The diffuser 20 is applied directly on top of an LED 60 virtually increasing the size of the LED without changing the light beam (FIG. 6(b)) or changing it in a desired way, but without increasing the Etendue (FIG. 6(a)). The spatial diffuser can for example also be used to partly mix the light of more than one LED.

In a second example, the spatial diffuser can be used as a flat beam homogenizer. Such homogenizer can be placed on top of a collimator or an array of collimators to produce a uniform luminous output while preserving the collimation.

Figure 7:
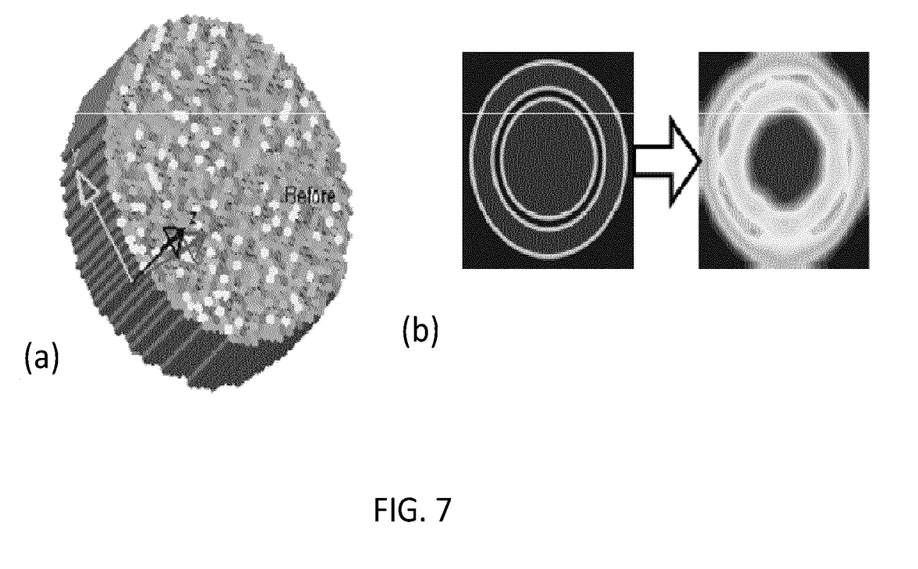
FIG. 7 shows a third possible use of the diffuser.

FIG. 7(a) shows the appearance of the diffuser. In one example which has been simulated to provide the images shown in FIG. 7(b), the spatial diffuser is 1.8 mm thick with 2000 hexagonal angled facets. The angled facets are 100 μm wide. A thicker spatial diffuser can be used to improve the beam homogeneity.

FIG. 7(b) shows the initially inhomogeneous beam exiting the collimator, and shows how this is changed to become much more homogeneous after exiting the spatial diffuser.

The invention can be employed in illumination optics and lighting applications. It is especially suited for LED lighting applications, because it solves the problem of spottiness, colour mixing/inconsistency and glare by relatively simple means. Additionally, it can be used instead of bulky beam homogenizers in applications where beam homogenizers are currently used.

The diffuser can be formed as a single slab, for example moulded to provide the desired angled facet patterns. Alternatively, there can be a central core and angled facet patterns applied as surface layers.

The diffuser should be as thin as possible to keep the dimensions low, but the thicker the diffuser the more it can homogenize. The thickness can be limited by the precision of the facet angles. By way of example, the thickness can be in the range 1 mm-200 mm. Each angled facet can for example have a linear dimension of 0.001 mm-10 mm. Generally, one design aim is to be small enough so that the user does not clearly see the granularity. On the other hand, in some cases it may be desired to see granularity as a design feature.

The LED exit window to be homogenised can be of any size, for example in the range 1 cm-50 cm.

There is a relation between the inhomogeneity scale and the number of angled facets. The size of the angled facets should be smaller than the inhomogeneity scale. If homogeneity is of the order of size of the exit window, there could be at least 100 angled facets to cover that window (a 10×10 array). There may be $10^3$ to $10^6$ angled facets by way of example.

The diffuser slab can for example be made of glass, fused silica, transparent ceramics (for example YAG), PMMA, silicone, or polycarbonate.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A light diffuser comprising:
a slab of material having a first main surface and a second main surface opposing the first main surface, wherein both the first main surface and the second main surface comprise an array of light directing elements,
the light directing elements of the first main surface comprising at least a plurality of first angled facets, each having a first curved profile and a first angled orientation relative to the first main surface, and an in plane facet oriented in plane with the first main surface,
the light directing elements of the second main surface comprising at least a plurality of second angled facets, each having a second curved profile and a second angled orientation relative to the second main surface, and an in plane facet oriented in plane with the second main surface, each of the second angled facets being paired and conjugate with a respective one of the first angled facets to form a conjugate pair,
wherein light impinging in a first direction on said first main surface is deflected by each of the first angled facets to a respective one of the second angled facets,
wherein said deflected light impinging on the second angled facets is redirected in an output direction, and
wherein light paths of the light impinging in the first direction on the first main surface are swapped among conjugate pairs of the first and second angled facets to provide spatial light shuffling function.

2. The light diffuser as claimed in claim 1, wherein each of the first angled facets directs incident light to corresponding one of the second angled facets within a predetermined radius from a location on the second main surface directly opposing each first angled facet on the first main surface.

3. The light diffuser as claimed in claim 1, wherein the in plane facets and the first and second angled facets tessellate to fill a surface area of the light diffuser.

4. The light diffuser as claimed in claim 1, wherein the first and second angled facets have a square shape or a hexagonal shape.

5. The light diffuser as claimed in claim 1, wherein, for each first angled facet of the first main surface and a corresponding paired second angled facet of the second main surface not directly opposite the first main surface, a third angled facet of the first main surface in a position opposite the corresponding paired second angled facet is paired with a fourth angled facet of the second main surface in a position opposite said each first angled facet.

6. The light diffuser as claimed in claim 1, wherein the first and second angled facets comprise planar surfaces.

7. The light diffuser as claimed in claim 1, wherein the first and second angle facets include lensing surface shapes.

8. The light diffuser as claimed in claim 1, wherein the second main surface has an area greater than that of the first main surface.

9. The light diffuser as claimed in claim 1, wherein the second angled facets have an area greater than that of the first angled facets.

10. An LED lamp arrangement, comprising:
an LED lighting unit; and
the light diffuser as claim in claim 1.

11. The arrangement as claimed in claim 10, wherein the LED lighting unit comprises a plurality of LEDs, wherein the light diffuser is configured to mix light emitted by the LED lighting unit.

12. The arrangement as claimed in claim 10, further comprising a collimator between the LED lighting unit and the light diffuser.

13. A method of manufacturing a light diffuser, the method comprising:

A) providing a slab of material having a first surface and a second surface opposing the first surface;
B) choosing a first angled facet having a first curved profile at a first location on the first surface;
C) choosing a second angled facet having a second curved profile at a second location on the second surface within a predetermined radius of a location on the second surface opposite the first location of the first angled facet,
D) defining the first and second angled facet as a corresponding first pair;
E) defining a third angled facet of the first surface in a position opposite the second angled facet and a fourth angled facet of the second surface in a position opposite the first angled facet as a second pair;
F) manufacturing the light diffuser by forming all the paired angled facets in the first and second surfaces of said slab of material, thereby allowing the light diffuser to direct incident light from one of the paired angled facets in the first surface to a corresponding one of the paired angled facets in the second surface.

14. The method as claimed in claim 13, wherein Step C) comprises applying a probability density function to make it more probable to choose other angled facets that lie further away from the first angled facet.

15. The method as claimed in claim 13, wherein Step F) comprises filing regions of the first and second surfaces having no angled facets with in plane facets.

* * * * *